United States Patent [19]

Masuda

[11] Patent Number: 4,785,849

[45] Date of Patent: Nov. 22, 1988

[54] PRESSURE REDUCING VALVE ASSEMBLY

[75] Inventor: Kenji Masuda, Settsu, Japan

[73] Assignee: Daikin Industries Ltd., Osaka, Japan

[21] Appl. No.: 2,754

[22] PCT Filed: Jun. 6, 1986

[86] PCT No.: PCT/JP86/00282

§ 371 Date: Dec. 17, 1986

§ 102(e) Date: Dec. 17, 1986

[87] PCT Pub. No.: WO86/07476

PCT Pub. Date: Dec. 18, 1986

[30] Foreign Application Priority Data

Jun. 12, 1985 [JP] Japan ............................. 60-128476
Jul. 16, 1985 [JP] Japan ............................. 60-157772
Jul. 16, 1985 [JP] Japan ............................. 60-157773

[51] Int. Cl.$^4$ ............................................. F15B 13/043
[52] U.S. Cl. ................................. 137/625.64; 91/433; 137/625.6
[58] Field of Search ............ 91/433; 137/625.6, 625.64

[56] References Cited

U.S. PATENT DOCUMENTS

| 3,234,857 | 2/1966 | de Coye de Castelet | 91/433 X |
| 4,321,941 | 3/1982 | Hunschede et al. | 137/116.3 |
| 4,590,968 | 5/1986 | Wolfges | 137/625.64 |
| 4,617,968 | 10/1986 | Hendrixon | 137/625.64 |

FOREIGN PATENT DOCUMENTS

| 2903560 | 8/1980 | Fed. Rep. of Germany | 137/625.64 |
| 1259153 | 5/1960 | France . | |
| 2102158 | 1/1983 | United Kingdom | 137/625.64 |

Primary Examiner—Gerald A. Michalsky
Attorney, Agent, or Firm—Birch, Stewart, Kolasch & Birch

[57] ABSTRACT

A pressure reducing valve assembly comprising a main valve (11) and a pilot valve (22), wherein a cylindrical chamber (12) of the main valve (11), which has annular grooves (17, 16, 15) provided with an inlet port (A), an outlet port (B), and a return port (T), respectively, accommodates therein a slidable spool (13) so that a pilot chamber (18) opening into the outlet port (B) is formed at one end of the spool (13) and at the other end thereof is formed a control chamber (25). The inlet port (A) of the main valve (11) being connected with that (a) of the pilot valve by way of a passage (51) while the control chamber of the main valve is connected with the outlet port (b) of the pilot valve by way of a passage (52), whereby the fluid pressure at the outlet port of the main valve can be set high with a small operating force of an electromagnetic unit (48) of the pilot valve (22). This pressure reducing valve assembly is used to regulate the pressure of the fluid to be supplied to or drained from a hydraulic cylinder of a car clutch, for example.

5 Claims, 6 Drawing Sheets

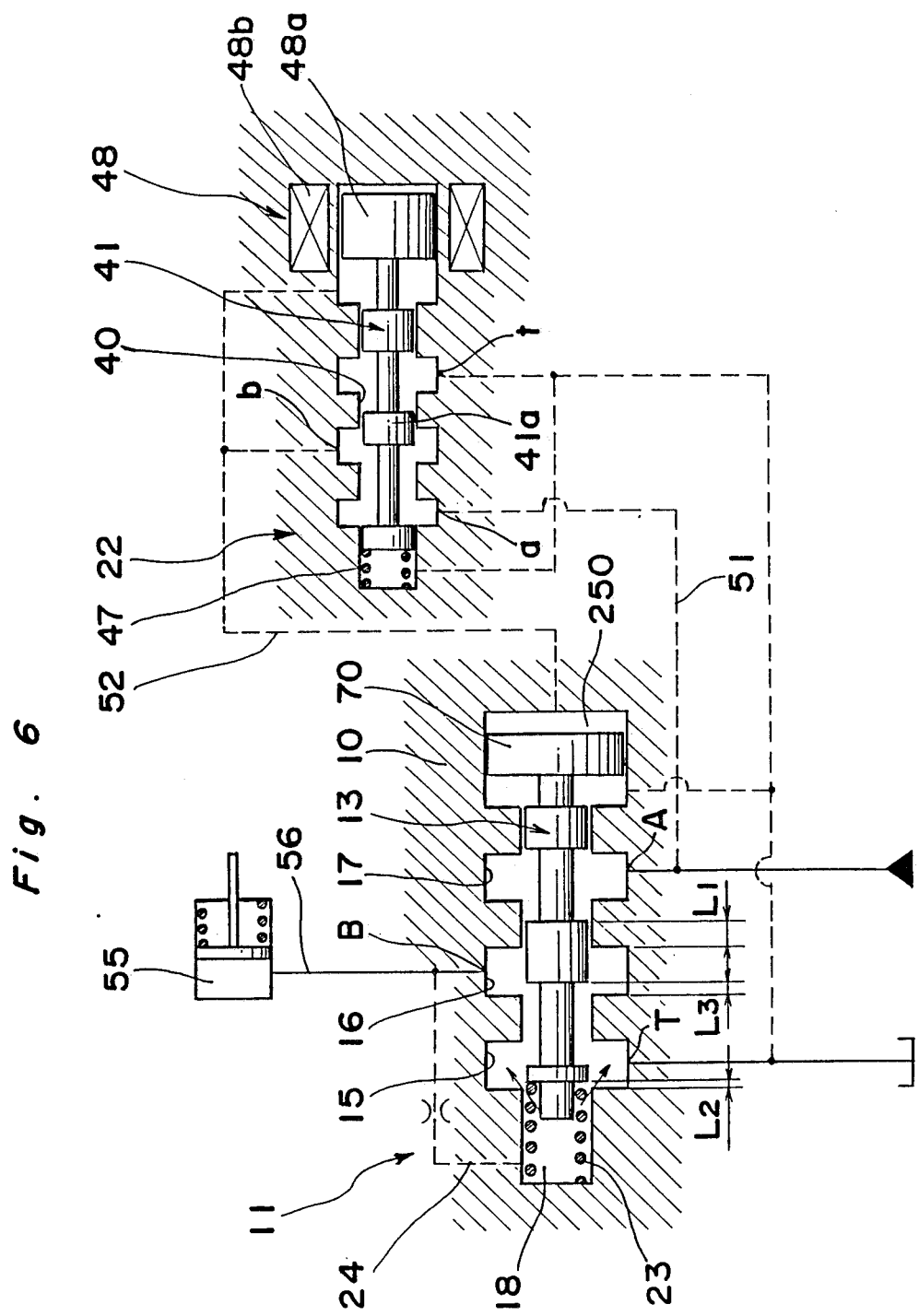

PRESSURE REDUCING VALVE ASSEMBLY

FIELD OF THE INVENTION

The present invention relates to a pressure reducing valve assembly comprising a main valve and a pilot valve.

BACKGROUND OF THE INVENTION

A conventional pressure reducing valve assembly is shown in FIG. 1 (JP Laid-open Publication No. 111525/1978). This pressure reducing valve assembly is provided with a spool which is slidably accommodated in a cylindrical chamber 9 formed inside a housing 1 and is adapted to introduce a fluid pressure at an outlet port B to a pilot chamber 3 formed at one end of a spool 2 by way of a passage 4. The other end of the spool 2 is pressed with the aid of an electromagnetic unit 5, and then the spool 2 is axially moved so that the pressure $P_B$ at the outlet port B or the pressure of the pilot chamber 3 is adapted to be counterbalanced to the operating force caused by the electromagnetic unit 5 and the pressure $P_B$ can be regulated. The fluid medium flows from an inlet port A to the outlet port B, being controlled at a corner 6a on one end of the land 2a of the spool 2. The corner 6a is so designed that the fluid medium may diverge from the core of the spool 2 in the shape of trumpet as shown with an arrow. A fluid medium flows from the pilot chamber 3 communicated to the outlet port B to a return port T, being regulated at a corner 6b on one end of a land 2b of the spool 2. The corner 6b is so designed that the fluid medium may diverge from the core of the spool 2 in the shape of trumpet as shown with an arrow. In this manner, this traditional pressure reducing valve assembly does not allow the occurrence of what is called a convergent flow to cause the spool 2 to become unstable. Thus, the spool 2 Can be stable, and the generation of vibration and noise can be prevented.

However, this conventional pressure reducing valve assembly has an inherent disadvantage as follows: since the pressure $P_B$ at the outlet port B to be introduced into the pilot chamber 3 is adapted to counterbalance with the limited operating force of the electromagnetic unit 5 with the spool 2 interposed therebetween, the pressure $P_B$ can not be regulated high. In other words, it is impossible in a practical use to control the pressure $P_B$ at the outlet port B to be high with the aid of the electromagnetic unit 5, because it is necessary for the electromagnetic unit 5 to increase in size and weight in order to generate a strong pushing force. On the other hand, if the diameter of the spool 2 is made larger to control a large amount of fluid flow, the fluid power applied to the end of the spool 2 on the side of the pilot chamber 3 will be stronger and consequently, the operating force of the electromagnetic unit 5 cannot be counterbalanced to the fluid power. In short, the disadvantage inherent in said conventional pressure reducing valve assembly lies in its unability of regulating the large amount of fluid flow by means of high pressure.

Accordingly, the object of the present invention is to control the fluid pressure to be high and to control a large amount of fluid flow, simultaneously obtaining a stability of a spool due to the divergency of the fluid flow.

DISCLOSURE OF THE INVENTION

The pressure reducing valve assembly according to the present invention is that comprising a main valve, wherein a valve housing defines a cylindrical chamber provided with annular grooves each of which has an inlet port A, an outlet port B, and a return port T, respectively, a spool having at least three lands being slidably accommodated in said cylindrical chamber, so that at one end of said spool is formed a pilot chamber communicated to said outlet port B by way of a passage while at the other end thereof is formed a control chamber, whereby the fluid flow passing from the inlet port A to the outlet port B and between the corner of said land in the center and the rim of the end face of the annular groove provided with said outlet port B diverges relative to the axial core of the spool in the form of a trumpet, and the fluid flow passing from the pilot chamber to the return port T and between the corner of said land on the side of said pilot chamber and the rim of the end face of the annular groove provided with said return port diverges relative to the axial core of the spool in the form of a trumpet; and a pilot valve, wherein a valve housing defines a cylindrical chamber provided with an inlet port a, an outlet port b, and a return port t, a spool equipped with lands being slidably accommodated in the chamber, so that at one end of the spool is formed a chamber communicated to said outlet port b by way of a passage while an adjustable pushing means to push the other end of said spool is disposed at said other end, Where the inlet port a of said pilot valve is connected with the inlet port A of said main valve by way of a passage, while the outlet port of said pilot valve is connected with the control chamber of said main valve by way of a passage.

Since the diameter of the spool of the pilot valve is smaller than that of the spool of the main valve, the pilot valve can set the pressure at the outlet port b high even if the pressing force of the pressing means of the pilot valve may be small. The pressure in the control chamber on one side of the spool is controlled at a predetermined value by the pilot valve. Accordingly, the spool of the main valve is operated in accordance with the balance between the pressures to act on the opposite ends thereof, so that the pressure at the outlet port B is regulated to be a predetermined pressure lower than the pressure at the inlet port A. Thus, the pressure in the pilot chamber communicated to the outlet port B is caused to be counterbalanced to the pressure in the control chamber with the spool being disposed therebetween, so that the spool moves. Then the pressure at the outlet port B is reduced by controlling the fluid flow from the inlet port A to the outlet port B and that from the pilot chamber to the return port T with the aid of the movement of the spool of the main valve. Therefore, the pressure at the outlet port B of the main valve can be set high and the spool of the large diameter of the main valve can be operated for controlling a great amount of fluid flow just by setting the pressure at the outlet port b of the pilot valve high with a small operation power of the pressing means of the pilot valve. Both of fluid flows from the inlet port B of the main valve to the annular groove where the outlet port B is formed and from the pilot chamber to the annular groove where the return port T is formed are divergent flows, whereby the movement of the spool of the main valve comes to be stable, independent of the operative condition of the actuator and the generation of vibration and noise of the main valve is prevented. In other words, the fluid pressure at the outlet port B is stabilized.

BRIEF DESCRIPTION OF DRAWINGS

FIGS. 2, 3, 4, 5, and 6 are schematic views of embodiments according to this invention.

THE BEST EMBODIMENT OF THE INVENTION

This invention will be hereinafter described by way of example shown.

Figure 1:
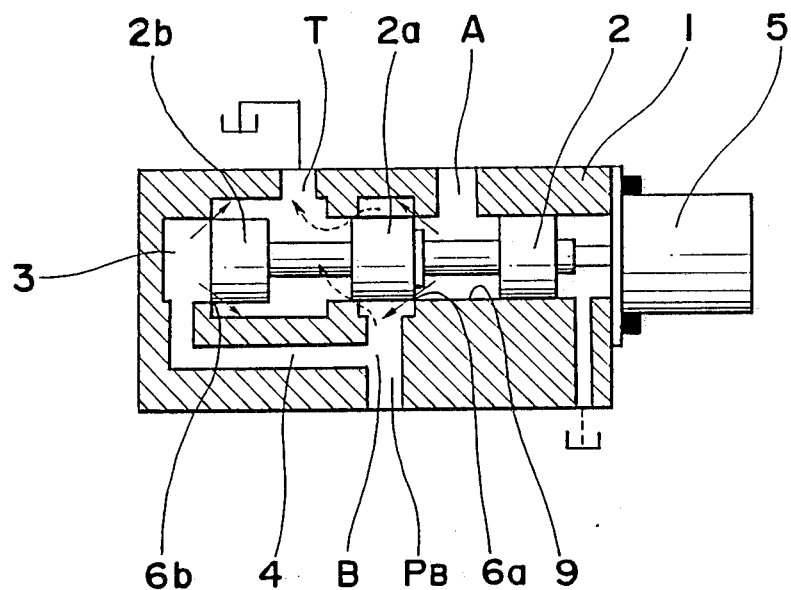
FIG. 1 is a sectional view of a conventional pressure reducing valve assembly.
Figure 2:
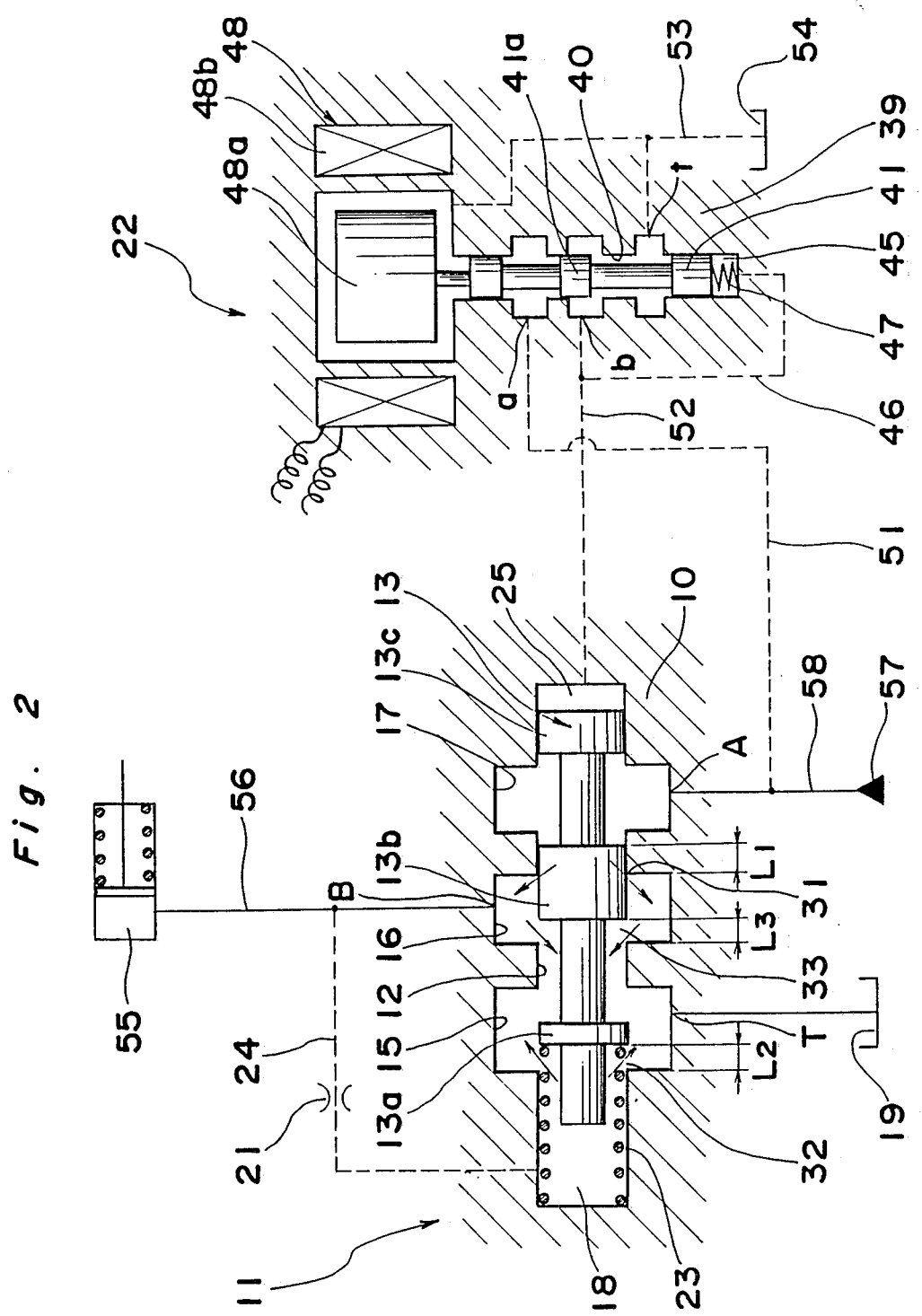

Referring now to FIG. 2, a main valve is designated by a numeral 11 and an pilot valve by 22. In the main valve 11, a spool 13 including three lands 13a, 13b, and 13c is slidably accommodated in a cylindrical chamber 12 formed in a valve housing 10, whereby a pilot chamber 18 is formed at one end of the spool 13 while a control chamber 25 is formed at the other end thereof. The cylindrical chamber 12 is provided with spaced annular grooves 15, 16, and 17 from the left in FIG. 2, which annular grooves 15, 16, and 17 are provided with a return port T communicated to a tank 19, an outlet port B, and an inlet port A, respectively.

Said outlet port B is communicated to the pilot chamber 18 through a passage 24 having an orifice 21, the pilot chamber being provided with a biasing spring 23 to push the spool 13 in a longitudinal direction.

On the other hand, in the pilot valve 22, the outlet port b thereof is switched either to the inlet port a or to a return port t by a land 41a of a spool 41 of the pilot valve 22 which is arranged to slide axially inside a cylindrical chamber 40 formed in a valve housing 39. The outlet port b is connected with a chamber 45 at one end of said spool 41 through a passage 46. The chamber 45 has therein a pressed biasing spring 47 with a weak spring force to determine a rest position of the spool 41. There is provided an electromagnetic unit 48 as an example of a regulatable pressing means at the other end of the spool 41, a plunger 48a of said electromagnetic unit 48 axially pressing the center of the spool 41. The pressing force of this plunger 48a is substantially in proportion to the electric current applied to the solenoid 48b of the electromagnetic unit 48, independent of the axial position of the plunger 48a. Accordingly, the spool 41 of the pilot valve 22 connects the outlet port b either with the inlet port a or with a return port t so that the pushing force of the plunger 48a and the pressure in the chamber 45 or of the outlet port b will be in a state of equilibrium. This means that the pressure of the outlet port b is regulated in accordance with the pushing force of the plunger 48a of the electromagnetic unit 48, in other words, with its current value. The diameter of the spool 41 is small and, therefore, the fluid power acting on the end thereof is small. This means that the plunger 48a can operate the spool 41 even with its small pressing force.

The inlet port a of the pilot valve 22 is connected with the inlet port A of the main valve 11 through a passage 51, while the outlet port b of said pilot valve 22 is connected with the control chamber 25 of the main valve 11 through a passage 52. As a result, the spool 13 of the main valve 11 is caused to move according to the balance between the fluid pressure inside the pilot chamber 18, acting on one end of the spool 13, and that inside the control chamber 25 acting on the other end thereof. Then the spool 13 controls the opening of the passage 32 to be formed between the left side edge of the land 13a and the intersecting line of the end surface of the annular groove 15 on its left side and the peripheral surface of the cylindrical chamber 12 as well as the opening of the passage 33 to be formed between the left side edge of the land 13b and the intersecting line of the end surface of the annular groove 16 on its left side and the peripheral surface of the cylindrical chamber 12 so that the difference between the fluid pressure inside the control chamber 25 and that inside the pilot chamber 18 will correspond to the spring force of the biasing spring 23. The fluid flow from the inlet port A to the outlet port B will be a flow diverging from the axial core of the spool 13 in the form of a trumpet as shown with an arrow, because the diameter of the annular groove 16 is larger than that of the cylindrical chamber 12. And also, the flow from the pilot chamber 18 to the return port T will be a divergent flow as shown with an arrow, because the diameter of the annular groove 15 is larger than that of the pilot chamber 18 or of the cylindrical chamber 12. Accordingly, the movement of the spool 13 is made stable and no vibration and/or noise occurs.

As shown in FIG. 2, assuming that the distance between the left end of the land 13a of said spool 13 and that of the annular groove 15 is $L_2$, that the distance between the left end of the land 13b and that of the annular groove 16 is $L_3$, and that the distance between the right end of the land 13b and that of the groove 16 is $L_1$, they have a relation as follows;

$$L_3 < L_2, \ L_3 < L_1, \ L_1 \gtreqless L_2$$

The case wherein there is a large amount of return oil from the outlet port B to the return port T is now taken into consideration. When $L_1 > L_2$, the passage from the outlet port B to the return port T or the third pressure control section 33 opens after the first pressure control section 31 or the passage from the inlet port A to the outlet port B closes and the second pressure control section 32 or the passage from the pilot chamber 18 to the tank port T opens. In case of $L_1 < L_2$, the third pressure control section 33 opens after the second pressure control section 32 opens and the first pressure control section 31 closes. In case of $L_1 = L_2$, closing of the first pressure control section 31 and opening of the second pressure control section 32 are simultaneously performed and, after that, the third pressure control section 33 opens.

A hydraulic cylinder 55 is connected with the outlet port B of said main valve 11 by way of a passage 56, while a power source 57 is connected with the inlet port A of the main valve 11 by way of a passage 58. The return port t is connected with a tank 54 by way of a drain passage 53.

In such a construction as mentioned above, the electric current i to be applied to the solenoid 48b of the electromagnetic unit 48 of the pilot valve 22 is adjusted, and the fluid pressure at the outlet port b of the pilot valve 22 is regulated so as to be a value in proportion to the electric current value i, whereby the fluid pressure in the control chamber 25 of the main valve 11 is regulated to be the value of the fluid pressure in the outlet port b of the pilot valve 22. Then, the spool 13 of the main valve 11 moves in an axial direction so that the balance between the fluid pressure in the control chamber 25 to push the right end of the spool 13 and that in the pilot chamber 18 to push the left end of the spool 13 will become equal to the operating force of the spring 23. In this way, the spool 13 regulates the opening width of the first pressure control section 31 and of the second pressure control section 32, whereby it regulates the pressure at the outlet port B to be a value which is predetermined.

In the regulating operation aforementioned, while the spool 13 is operating so as to open the first pressure control section 31 wider, the fluid flow from the inlet port A to the outlet port B through the first pressure control section 31 diverges relative to the axial core of the spool 13 in the form of a trumpet, in other words, the amount of fluid flow increases. Similarly, while the spool 13 is operating so as to narrow the first pressure control section 31, the fluid flow from the pilot chamber 18 to the return port T through the second pressure control section 32 diverges relative to the axial core of the spool 13 in the form of a trumpet and the amount of flow increases. Accordingly, the movement of the spool 13 is made stable and no vibration and/or noise occurs. The orifice disposed in the passage 24 communicated to the pilot chamber 18 is a damper restriction which has a function of limiting the fluid flow supply to the pilot chamber 18 and decreasing the pressure in the pilot chamber 18 when the spool 13 moves from the side of the pilot chamber 18 toward the control chamber 25. Due to this function, the damper restriction effectively damps the spool 13 and causes the main valve 11 to move more stably. The pressure at the outlet port B is regulated by controlling the pressure in the control chamber 25 of said main valve 11 by the pilot valve 22 and then causing the spool 13 to move with the aid of the fluid pressure in the pilot chamber 18 of the main valve 11 acting on one end of the spool 13 and that in the control chamber 25 acting on the other end thereof. Accordingly, the pressure at the outlet port B of the main valve 11 can be regulated high only by pushing the spool 41 of the pilot valve 22 with a small pushing force of the electromagnetic unit 48. A great amount of the fluid flow can be also regulated when the diameter of the spool 13 is made large.

The third pressure control section 33 of the main valve 11 is for the further drainage of the fluid medium, additionally to the drainage through the second pressure control section 32, when the fluid pressure at the outlet port B is excessive.

Figure 3:
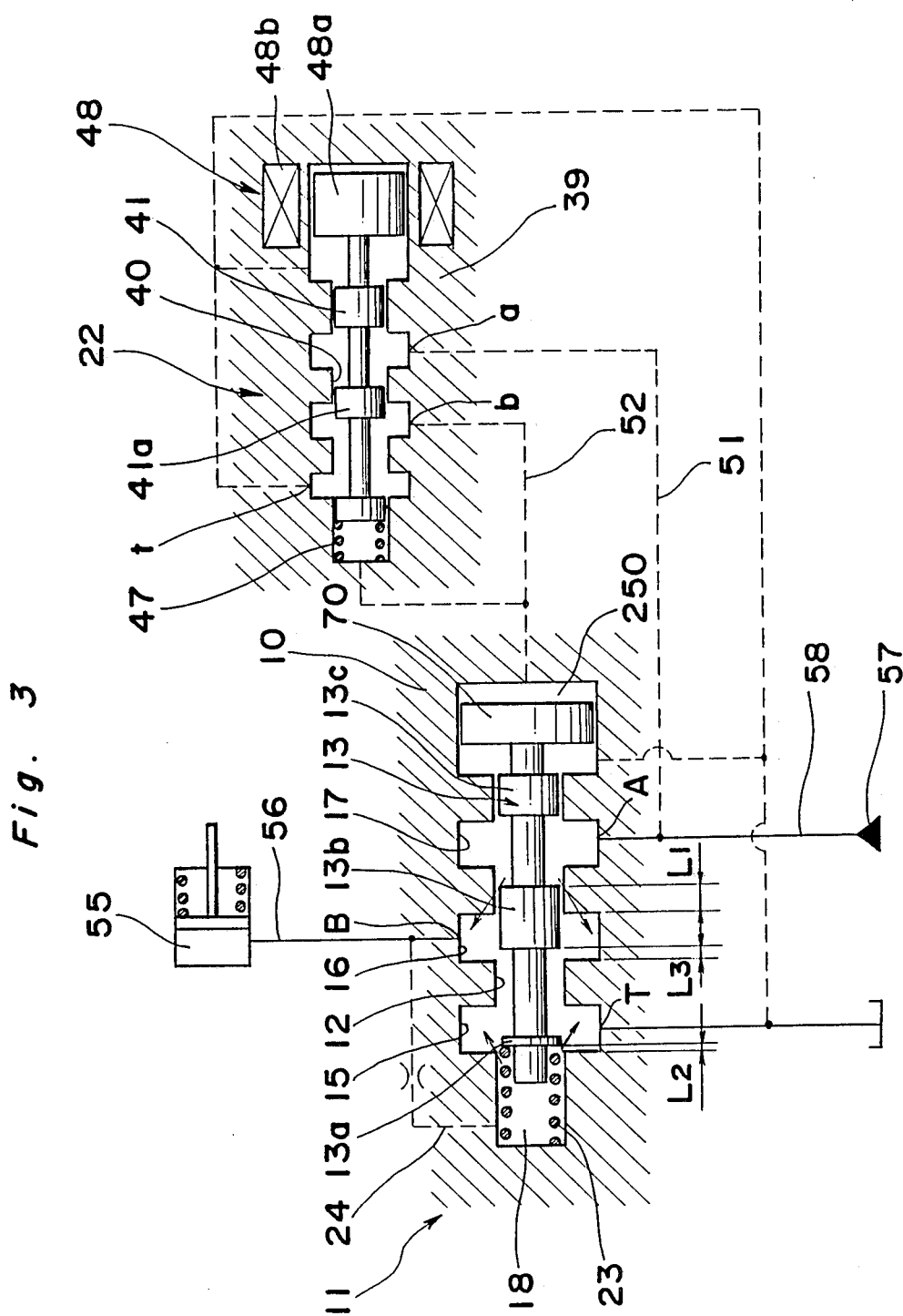

FIG. 3 shows another embodiment of this invention, where, in the main valve 11, the cylindrical chamber 12 having the spool 13 slidable therein is disposed in a line with the adjacent control chamber 250 of a diameter larger than that of the spool 12.

In the control chamber 250 is slidably accommodated a piston portion 70 having a diameter larger than that of the lands 13a, 13b, and 13c of said spool 13. The fluid pressure introduced from the outlet port b of the pilot valve 22 into the control chamber 250 by way of the passage 52 is adapted to act on the end of the piston portion 70, the spool 13 being arranged to be axially pushed toward the pilot chamber 18 with the aid of the piston portion 70. The chamber formed between the piston portion 70 and the land 13c of the spool 13 is connected with the return port T. Thus, since the fluid pressure is applied to the end surface of the piston portion 70 having a larger area than that of the end surface of the spool 13, the spool 13 can be moved with a large force against a flow force, for example, and the like to act on the spool 13. And also, the pressure at the inlet port A can be made the same as that at the outlet port B with the maximum opening of the first pressure control section 31.

The piston portion 70 and the spool 13 are made of separate parts in the above embodiment, though they can be constructed as one part.

It is to be noted that, in the pressure reducing valve assembly in FIGS. 2 and 3, like parts are designated by like reference numerals.

Figure 4:
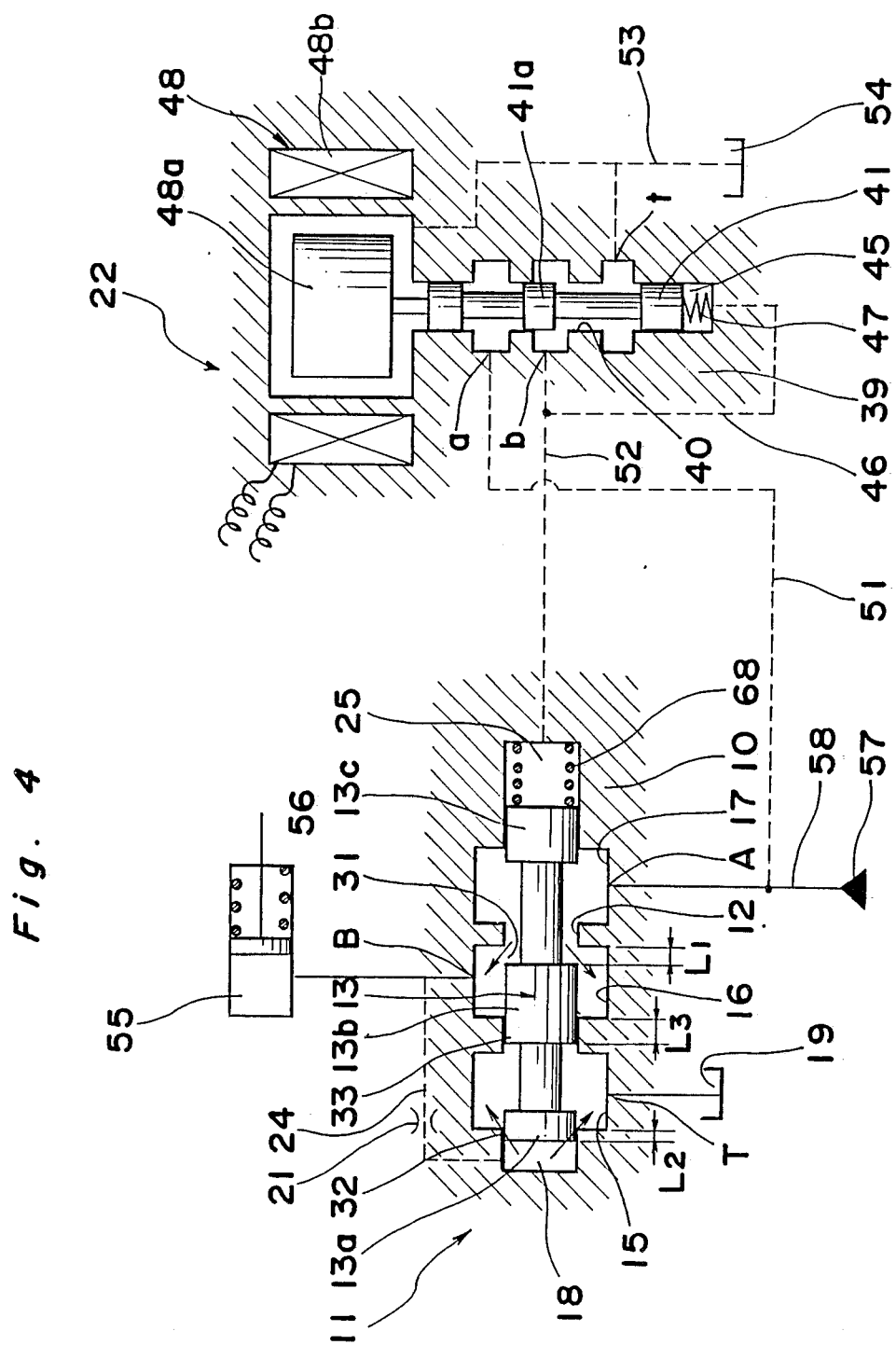

In the pressure reducing valve assembly in another embodiment shown i FIG. 4, the pilot valve 22 is constructed identically with the pilot valve 22 in the pressure regulating valve according to the embodiment shown in FIG. 2, however the structure of the main valve is different from that of FIG. 2. The main valve 11 shown in FIG. 4 has a biasing spring 68 in its control chamber 25, the biasing spring 68 being adapted to push the spool 13 toward the pilot chamber 18, whereby the main valve 11 will be arranged to be normally open.

Figure 5:
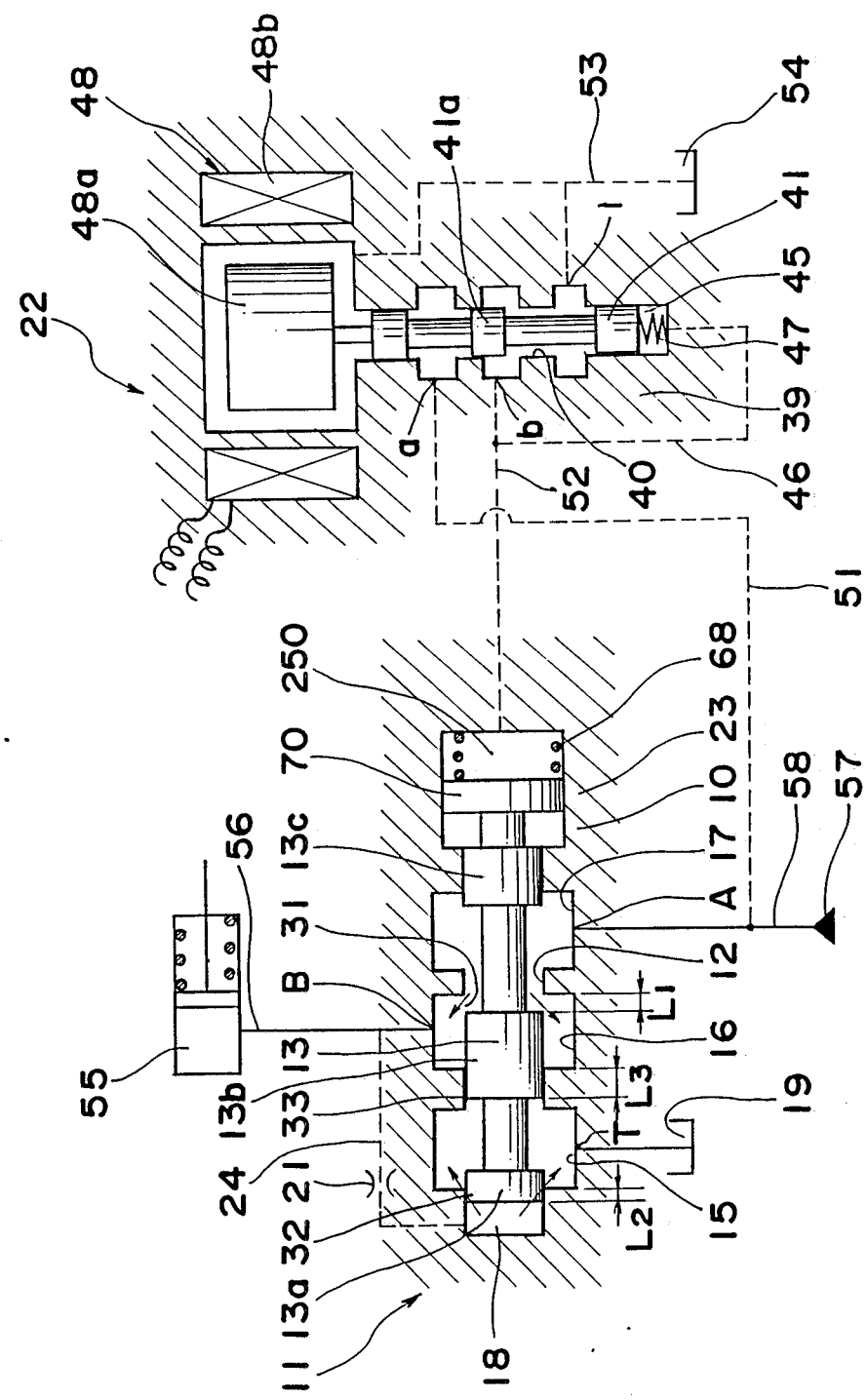

The embodiment shown in FIG. 5 is different from that in FIG. 4 in the following manner: the main valve 11 is provided with a piston portion 70 having an end surface larger in area than the spool 13, so that the fluid pressure is caused to act on the end of the piston portion 70, whereby the spool 13 can be moved with a strong force.

Referring now to FIG. 6, the embodiments shown here and in FIG. 3 are different from each other just in the structure of the pilot valve 22. The pilot valve 22 in the embodiment of FIG. 3 is of a normally closed type and that of FIG. 6 is of a normally open type. The control chamber 250 of the main valve 11 is normally connected with the inlet port A of the main valve 11 by way of the passage 51, the pilot valve 22 and the passage 52, and the spool 13 of said main valve 11 is normally moved toward the pilot chamber 18 by means of the piston portion 70 pushed by the fluid pressure. When the spring force of the biasing spring 47 of the pilot valve 22 is fully strengthened, it is possible to obtain such a pressure characteristic at the outlet port B as to be in inverse proportion to the electric current applied to the electromagnetic unit 48.

In FIGS. 3 and 6, $L_1 > L_3$, $L_2 > L_3$, $and$ $L_1 \leqq L_2$ like in FIG. 2. $L_3 > L_1$, $L_3 > L_2$, $L_1 \leqq L_2$ in FIGS. 4 and 5.

INDUSTRIAL UTILITY

The pressure reducing valve assembly according to the present invention can set high he fluid pressure at the outlet port b of the pilot valve 22 by means of the small operation force of the pushing means 48 of the pilot valve 22 in order to set high the pressure at the outlet port B of the main valve 11. That small force can operate the spool of the main valve no matter how large the diameter of the spool is, and so the great amount of fluid flow can be regulated. Owing to the divergency of the two fluid flows in the main valve, the movement of the spool thereof is made stable, and the generation of vibration or noise in the main valve can be decreased. Thus, the pressure reducing valve assembly of the present invention regulates the fluid pressure in a hydraulic device to decrease it by means of a small operative force. Accordingly, this pressure reducing valve assembly will be used to regulate the pressure of the fluid to be supplied to or drained from a hydraulic cylinder of a car clutch, for example.

What is claimed is:
1. A pressure reducing valve assembly comprising a main valve, wherein a valve housing (10) defines a cylindrical chamber (12) provided with annular grooves (17, 16, 15), each of which has an inlet port (A), an outlet port (B), and a return port (T), respectively, a spool (13) having at least three lands (13a, 13b, 13c) being slidably accommodated in said cylindrical chamber (12), so that at one end of said spool (13) is formed a pilot chamber (18) communicated to said outlet port (B) by way of a passage (24) while at the other end thereof is formed a control chamber (25, 250), whereby the fluid flow passing from the inlet port (A) to the outlet port (B) and between the corner of said land (13b) in the center and the rim of the end face of the annular groove (16) provided with said outlet port (B) diverges relative to the axial core of the spool (13) in the form of a trumpet, and the fluid flow passing from the pilot chamber (18) to the return port (T) and between the corner of said land (13a) on the side of said pilot chamber (18) and the rim of the end face of the annular groove (15) provided with said return port (7) diverges relative to the axial core of the spool (13) in the form of a trumpet; and a pilot valve, wherein a valve housing (39) defines a cylindrical chamber (40) provided with an inlet port (a), an outlet port (b), and a return port (t), a spool (41) equipped with lands being slidably accommodated in the chamber (40), so that at one end of the spool (41) is formed a chamber (45) communicated to said outlet port (b) by way of a passage (46) while an adjustable pushing means to push the other end of said spool is disposed at said other end, the chamber (45) containing a pressed biasing spring (47) to press the pilot spool (41) toward the adjustable pushing means (48), and the outlet port (b) being normally closed to the inlet port (a);

wherein the inlet port (a) of said pilot valve (22) is connected with the inlet port (A) of said main valve (11) by way of a passage (51), while the outlet port (b) of said pilot valve (22) is connected with the control chamber (25, 250) of said main valve by way of a passage (52).

2. A pressure reducing valve assembly of claim 1, wherein, in the pilot chamber (18) of said main valve (11) is placed a biasing spring (23) to push said spool (11) toward the control chamber (25, 250), so that the inlet port A is normally closed against the outlet port B.

3. A pressure reducing valve assembly of claim 2, wherein said control chamber (250) is formed in such a manner that the diameter thereof is larger than that of said chamber (12), and accommodates therein a slidable piston portion (70) of a larger diameter than that of the lands of said spool (13) to cause the pressure of the fluid medium introduced into said control chamber (250) to act on one end of said piston portion (70), the piston portion (70) being adapted to axially push said spool (13), the return port (T) being connected with a chamber formed between the other end of said piston portion (70) and the end face of the land (13c) of the spool (13).

4. A pressure reducing valve assembly of claim 1, wherein the control chamber (25, 250) of said main valve (11) accommodates a biasing spring (23) to push said spool (13) toward the pilot chamber (18), whereby the inlet port (A) is normally open to the outlet port (B).

5. A pressure reducing valve assembly of claim 4, wherein said control chamber (250) is formed in such a manner that the diameter thereof is larger than that of said chamber (12), and accommodates therein a slidable piston portion (70) of a larger diameter than that of the lands of said spool (13) to cause the pressure of the fluid medium introduced into said control chamber (250) to act on one end of said piston portion (70), the piston portion (70) being adapted to axially push said spool (13), the return port (T) being connected with a chamber formed between the other end of said piston portion (70) and the end face of the land (13c) of the spool (13).

* * * * *